(12) United States Patent
Karnes et al.

(10) Patent No.: US 10,168,070 B1
(45) Date of Patent: Jan. 1, 2019

(54) HVAC BOOT AND GRILLE ASSEMBLY

(71) Applicant: Havaco Technologies Incorporated, Erie, PA (US)

(72) Inventors: James Karnes, Erie, PA (US); Thomas Newman, Girard, PA (US)

(73) Assignee: Havaco Technologies Incorporated, Erie, PA (US)

( * ) Notice: Subject to any disclaimer, the term of this patent is extended or adjusted under 35 U.S.C. 154(b) by 791 days.

(21) Appl. No.: 14/033,413

(22) Filed: Sep. 20, 2013

Related U.S. Application Data

(60) Provisional application No. 61/703,359, filed on Sep. 20, 2012.

(51) Int. Cl.
*F24F 13/10* (2006.01)
*B23P 11/00* (2006.01)
*F24F 13/20* (2006.01)

(52) U.S. Cl.
CPC .............. *F24F 13/10* (2013.01); *B23P 11/00* (2013.01); *F24F 13/20* (2013.01)

(58) Field of Classification Search
CPC ............ F24F 13/10; F24F 13/20; B23P 11/00
USPC ................................. 454/332, 322, 331, 370
See application file for complete search history.

(56) References Cited

U.S. PATENT DOCUMENTS

| | | | | |
|---|---|---|---|---|
| 3,405,591 A | * | 10/1968 | Neuschotz | F16B 37/122 403/288 |
| 4,365,930 A | * | 12/1982 | Ogura | F04D 25/10 415/61 |
| 5,338,255 A | * | 8/1994 | Akehurst | F24F 13/06 248/27.1 |
| 5,800,259 A | * | 9/1998 | Olney | F24F 13/08 454/108 |
| 6,432,036 B1 | * | 8/2002 | Kim | A61H 39/08 600/9 |
| 6,478,673 B1 | * | 11/2002 | Haynes | F24F 13/06 285/319 |
| 7,140,960 B2 | * | 11/2006 | Pilger | F24F 13/06 454/292 |
| 2013/0043671 A1 | * | 2/2013 | Harman | F24F 13/02 285/3 |

* cited by examiner

*Primary Examiner* — Gregory Huson
*Assistant Examiner* — Dana Tighe
(74) *Attorney, Agent, or Firm* — Bachman & LaPointe, P.C.

(57) ABSTRACT

A register boot and grille can be quickly installed using the Zip Clips provided and a hollow threaded securement knob without the need for any tools. The method of installation is also claimed.

9 Claims, 3 Drawing Sheets

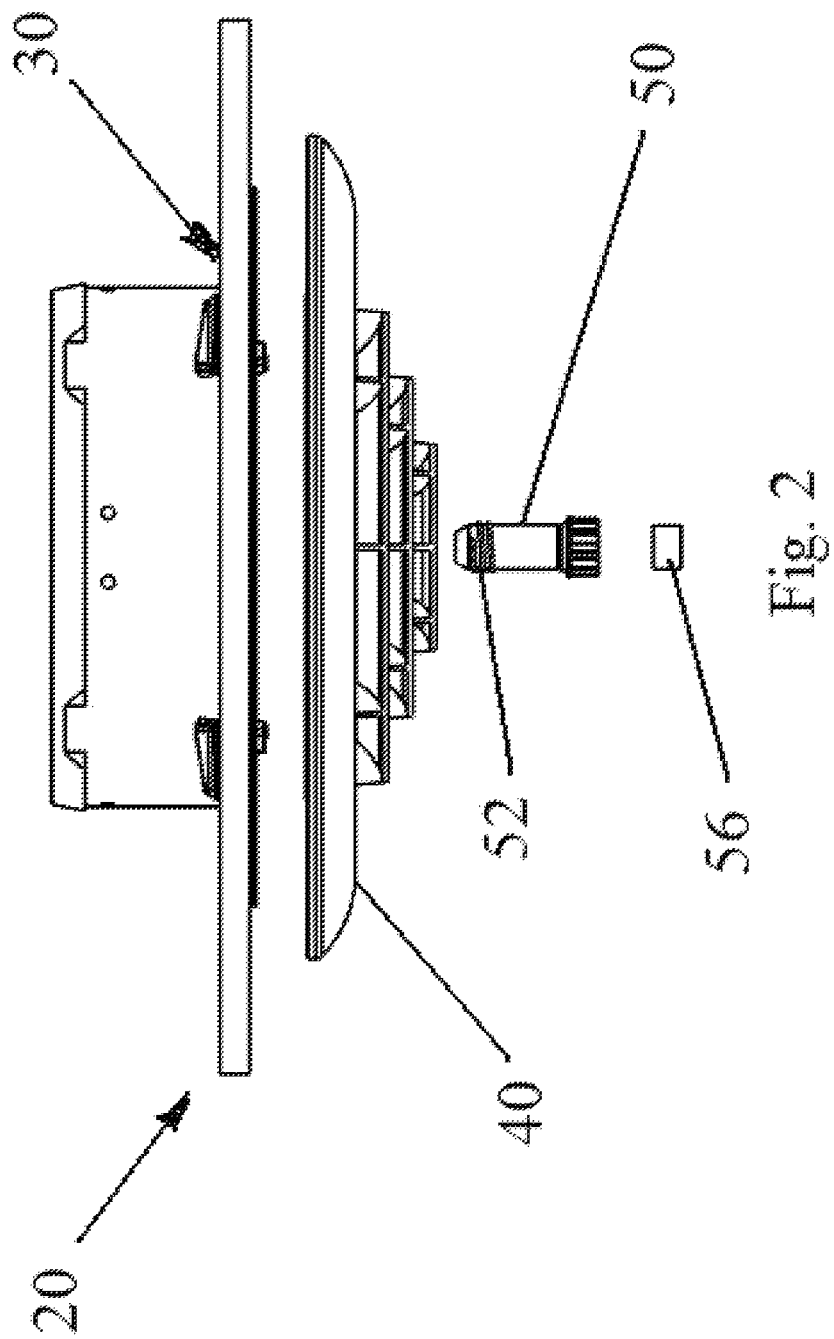

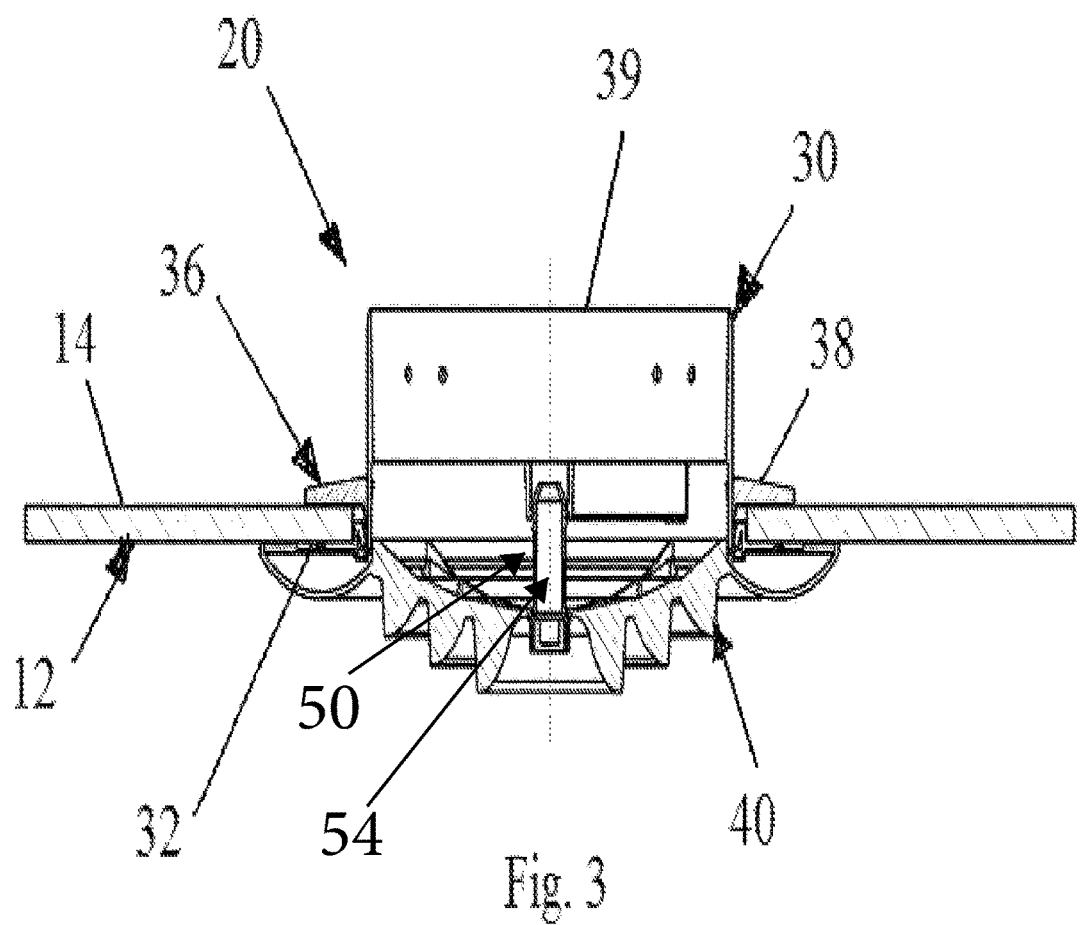

HVAC BOOT AND GRILLE ASSEMBLY

Applicants claim benefit of provisional patent application Ser. No. 61/703,359 filed Sep. 20, 2013 which is hereby incorporated by reference.

BACKGROUND AND SUMMARY OF THE INVENTION

The present invention is directed to boot for a heating, ventilating and air conditioning (HVAC) unit, a register grille which attaches to the boot via a knob, making the use of screws unnecessary. The knob has a throughbore which permits the hand or motorized adjustment of the damper using an elongated control rod, obviating the need to remove the knob to access the damper.

The boot will be inserted into hole in a ceiling similar to the way the collar of U.S. Pat. No. 7,338,095 (hereby incorporated by reference) inserts into the trunk line. Further, the features herein are related to applicants' earlier U.S. Pat. No. 6,196,597 which is also incorporated by reference. In this case, the boot is installed with the round part extending up, with flex duct attaching thereto. The Zip Clips will ratchet down to the ceiling level, and the drywall (or wallboard) will be sandwiched between the flange and the Zip Clip head. Then the grille will attach to the boot with a center knob that screws into a center bar (visible on the attachment) which will complete the installation. This is very similar to the Solatube product (Rillie et al.), U.S. Pat. Nos. 6,415,553 and 6,438,803, hereby incorporated by reference.

The use of Zip Clips and the threaded installation knob of the present invention permits tool-less installation of the grille and boot utilizing the Zip Clips to secure the boot in the opening and the knob threads into an opening in the boot to secure the grille to the boot. No screwdriver, hammer, plyers or any other tool is needed. This not only simplifies installation but greatly reduces the time necessary to perform the task. It also makes the product corrosion proof by eliminating any metallic component. Adjustment could be effected mechanically by installation of a motor with an adjustment control mounted on or adjacent the grille.

The present invention comprises a boot and grille assembly for an HVAC system which can be installed through wallboard, or the like, the assembly including: a) a boot having a radially extending flange and at least one vane adjustably secured inside said boot; b) a quick-connect fastener extending through the flange, the quick-connect fastener readily engaging a back side of the wallboard and securing the boot to the wallboard; c) a decorative grille adapted for securing to the boot; d) a securement knob for attaching the decorative grille to the boot, the securement knob having a hollow core; whereby an operating rod can be inserted through the hollow core to adjust the at least one vane. A plug may be inserted into the hollow end of the plug when adjustment is not contemplated.

Another aspect of the invention comprises a method of tool-less installation of a boot and grille assembly comprising the steps of a) securing the boot in an opening in a wallboard for attachment to an air duct utilizing zip clips; b) manually attaching an adjustable grille to the boot once it is secured in the opening in the wallboard using a hollow core threaded knob, the hollow core permitting access to adjust a vane in the boot to control and amount of airflow emanating through the grille.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2 is an exploded view of the boot, grille and securement knob of the present invention; and, FIG. 3 is a cross-sectional side view depicting the elements of the present invention installed.

DETAILED DESCRIPTION OF THE PREFERRED EMBODIMENTS

Figure 1:
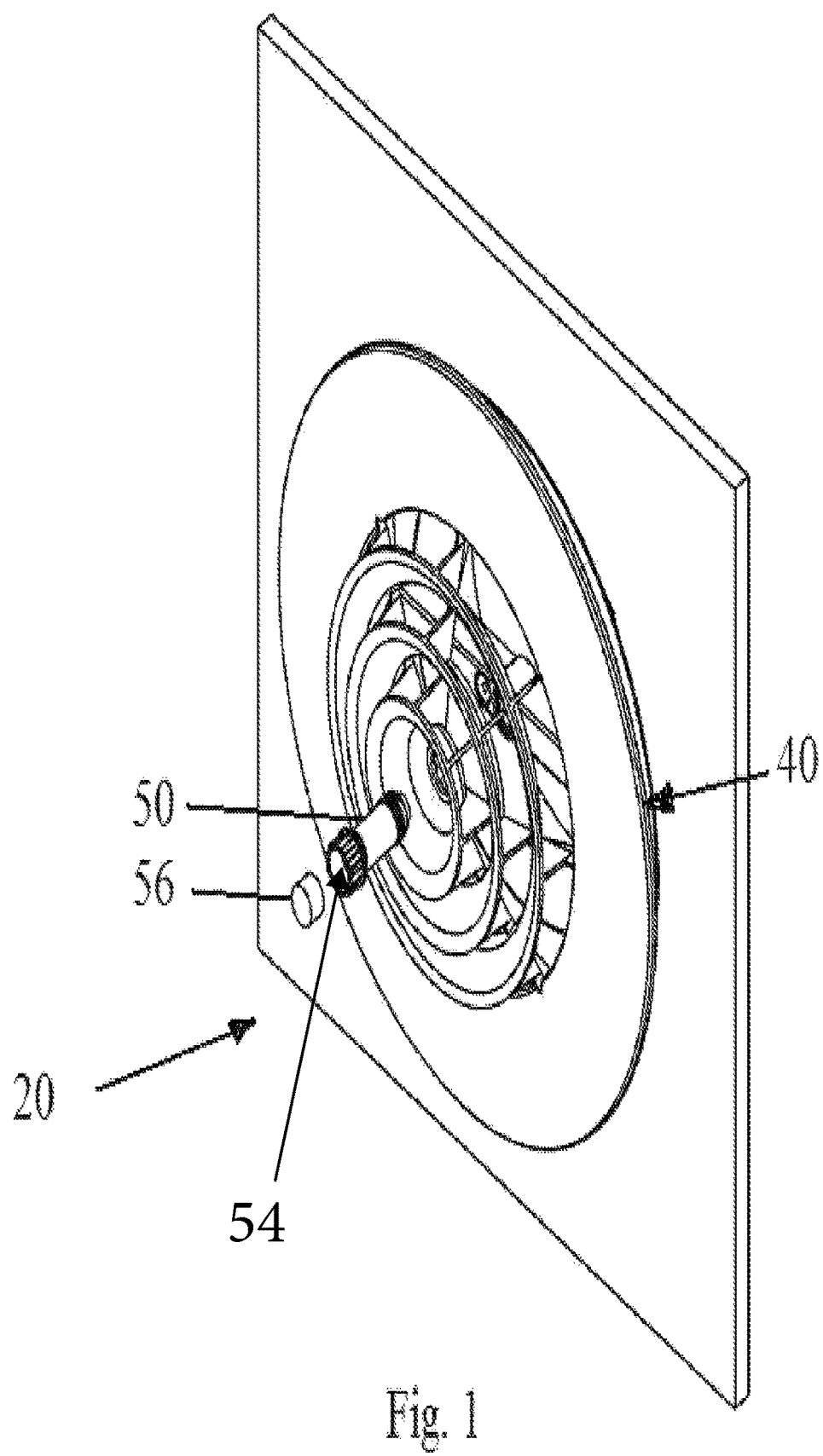
FIG. 1 is a front perspective view of a first embodiment of boot with the grille installed thereon and the installation knob of the present invention.

The boot and grille assembly of the present invention is shown in FIGS. 1-3 generally at 20. Boot 30 has a radially projecting flange 32 with openings 34 that receive Zip Clips 36. The pennant-shaped top 38 of the Zip Clip engages the hidden side 14 of wallboard 12 and holds in the opening. The use of Zip Clips 36 allows quick installation without the need for a screw driver, hammer, plyers, or any other tool. Further, Zip Clips 36 readily adjust to accommodate different thicknesses of wallboard.

As best seen in FIG. 3, securement knob 50 threads into an aperture in the boot 30 to attach register grille 40 in place. The design of the register grille 40 is a decorative feature and forms no part of the current invention. Securement knob 50 includes an external thread 52 which engages a complementary thread in the boot 30 and a hollow core 54 which permits a manual or motorized adjustment rod to be extended through the hollow core to engage and adjust the vane(s) 39 which are adjustably mounted in boot 30 to control the direction and amount of airflow emanating from the grille 40 as is customary with such devices. If manual adjustment is utilized a plug 56 can be inserted to prevent airflow through hollow core 54.

The entire method of installation of the boot 30 and grille 40 can be carried out without the need of a screw driver, hammer, plyers, or any other tool simply and quickly enabling installation to be completed in a fraction of the time significantly reducing risk of injury to the installer resulting from growing weary atop a ladder, scaffold, or the like.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A boot and grille assembly for an HVAC system which can be installed through wallboard, or the like, said assembly comprising:
   a) a boot having a radially extending flange and at least one vane adjustably secured inside said boot;
   b) a quick-connect fastener extending through said flange, said quick-connect fastener readily engaging a back side of the wallboard and securing said boot to the wallboard;

c) a decorative grille adapted for securing to said boot; and d) a securement knob threaded into the boot for attaching said decorative grille to said boot, said securement knob having a hollow core;

whereby an operating rod can be inserted through said hollow core to adjust said at least one vane.

2. The boot and grille assembly of claim 1 further comprising a plug insertable into a proximate end of said hollow core.

3. The boot and grille assembly of claim 1 wherein:
the securement knob is centrally located within the decorative grille.

4. A method of tool-less installation of a boot and grille assembly comprising the steps of
a) securing, utilizing zip clips, a boot in an opening in a wallboard for attachment to an air duct; and
b) manually attaching an adjustable grille to the boot once it is secured in the opening in the wallboard using a hollow core threaded knob, the manually attaching comprising threading the hollow core threaded knob into the boot, the hollow core permitting access to adjust a vane in the boot to control an amount of airflow emanating through the grille.

5. The method of claim 4 wherein:
the manually attaching comprises upwardly inserting the hollow core threaded knob centrally within the adjustable grille.

6. The method of claim 4 further comprising:
adjusting the vane via accessing through the hollow core of the threaded knob.

7. The method of claim 6 further comprising:
prior to the adjusting, removing a plug from the hollow core; and
after the adjusting, reinstalling the plug to the hollow core.

8. A boot and grille assembly for an HVAC system, said assembly comprising:
a boot having a radially extending flange and at least one vane adjustably secured inside said boot;
a grille removably secured to said boot; and
a hollow securement knob threaded into the boot centrally within the grille removably securing the grille to the boot.

9. The boot and grille assembly of claim 8 wherein:
the hollow securement knob has a hollow core providing access to adjust the at least one vane.

* * * * *